United States Patent
Morimoto et al.

(10) Patent No.: US 8,476,481 B2
(45) Date of Patent: Jul. 2, 2013

(54) METHOD FOR TREATING RADIOACTIVE LIQUID WASTE AND APPARATUS FOR THE SAME

(75) Inventors: Yasutomi Morimoto, Oarai-machi (JP); Mamoru Numata, Oarai-machi (JP); Takashi Kato, Yokohama (JP)

(73) Assignee: JGC Corporation, Tokyo (JP)

( * ) Notice: Subject to any disclaimer, the term of this patent is extended or adjusted under 35 U.S.C. 154(b) by 332 days.

(21) Appl. No.: 12/677,794

(22) PCT Filed: Nov. 28, 2008

(86) PCT No.: PCT/JP2008/071687
§ 371 (c)(1),
(2), (4) Date: Mar. 11, 2010

(87) PCT Pub. No.: WO2009/072443
PCT Pub. Date: Jun. 11, 2009

(65) Prior Publication Data
US 2010/0185036 A1 Jul. 22, 2010

(30) Foreign Application Priority Data
Dec. 5, 2007 (JP) ................................ 2007-315152

(51) Int. Cl.
*G21F 9/06* (2006.01)
*B01D 61/42* (2006.01)

(52) U.S. Cl.
USPC ...... 588/301; 204/630; 204/157.15; 204/627; 204/518; 422/22; 422/24; 210/748.01; 588/1; 588/400; 588/20; 588/300

(58) Field of Classification Search
USPC .. 210/748.01, 651, 757; 422/22, 24; 204/630, 204/627, 60, 532, 524, 523, 522, 520, 518, 204/517, 450, 177, 169, 164, 157.2, 157.15, 204/156, 155; 205/334, 34, 406, 408, 43; 588/20, 1, 204, 301, 302, 303, 401–415; 429/122, 188, 207, 209, 128
See application file for complete search history.

(56) References Cited

U.S. PATENT DOCUMENTS 5,578,181 A * 11/1996 Hirose et al. .................. 204/523
5,744,020 A * 4/1998 Akiyama et al. .............. 205/408

FOREIGN PATENT DOCUMENTS

CN 85105352 A 1/1987
CN 85100185 B 2/1988

(Continued)

OTHER PUBLICATIONS

S. Balagopal, et al., Selective sodium removal from aqueous waste streams with NaSICON ceramics, Separation and Purification Technology 15 (1999) 231-237.

(Continued)

*Primary Examiner* — Joseph Drodge
*Assistant Examiner* — Cameron J Allen
(74) *Attorney, Agent, or Firm* — Knobbe, Martens, Olson & Bear, LLP

(57) ABSTRACT

A method for treating a radioactive liquid waste containing a sodium salt, which includes: feeding a radioactive liquid waste containing at least one of sodium hydroxide, sodium hydrogencarbonate and sodium carbonate to an anode chamber in an electrolytic cell provided with an anode and a cathode on both sides of a permeable membrane, which is selectively permeable to sodium ions, and electrodialyzing the radioactive liquid waste; separating sodium ions permeated through the permeable membrane as sodium hydroxide from the radioactive liquid waste in a cathode chamber; separating a radioactive substance remaining in the anode chamber as a concentrated radioactive liquid waste; and recovering the separated sodium hydroxide and concentrated radioactive liquid waste, respectively.

3 Claims, 1 Drawing Sheet

FOREIGN PATENT DOCUMENTS

| | | | |
|---|---|---|---|
| CN | 01585988 A | | 2/2005 |
| EP | 1975945 A1 | * | 10/2008 |
| JP | 03-039698 A | | 2/1991 |
| JP | 04-502274 A | | 4/1992 |
| JP | 4283700 | | 10/1992 |
| JP | 06-082597 A | | 3/1994 |
| JP | 06317697 A | * | 11/1994 |
| JP | 08-066686 A | | 3/1996 |
| JP | 10-005551 A | | 1/1998 |
| JP | 2000-321395 | | 11/2000 |
| JP | 2000321395 A | * | 11/2000 |
| JP | 2002-181993 A | | 6/2002 |
| JP | 2004-354313 | | 12/2004 |
| WO | WO 2007/083588 | | 7/2007 |
| WO | WO 2007/083588 A1 | | 7/2007 |

OTHER PUBLICATIONS

D.E. Kurath, et al., Caustic recycle from high-salt nuclear wastes using a ceramic-membrane salt-splitting process, Separation and Purification Technology 11 (1997) 185-198.

D.T. Hobbs, Radioactive Demonstration of Caustic Recovery from Low-Level Alkaline Nuclear Waste by an Electrochemical Separation Process, WSRC-TR-97-00363 (1998).

Proceeding of Efficient Separations and Processing Crosscutting Program, 1995.

Proceeding of Efficient Separations and Processing Crosscutting Program, 1996.

Proceeding of Efficient Separations and Processing Crosscutting Program, 1997.

Ceramatec, Inc., Energy Efficient Process for Recycling Sodium Sulfate Utilizing Ceramic Solid Electrolyte, DOE contact No. DE-FC02-95CE41158 (1999).

Search Report issued by State Intellectual Property Office of the People's Republic of China on Jul. 13, 2012 in the corresponding Chinese patent application No. 2008801066969.

The extended European Search Report issued by European Patent Office on Sep. 5, 2012 in the corresponding European patent application No. 08856426.5.

Notice of Reasons for Rejection mailed by Japan Patent Office on Oct. 30, 2012 in the corresponding Japanese patent application No. 2009-544651.

* cited by examiner

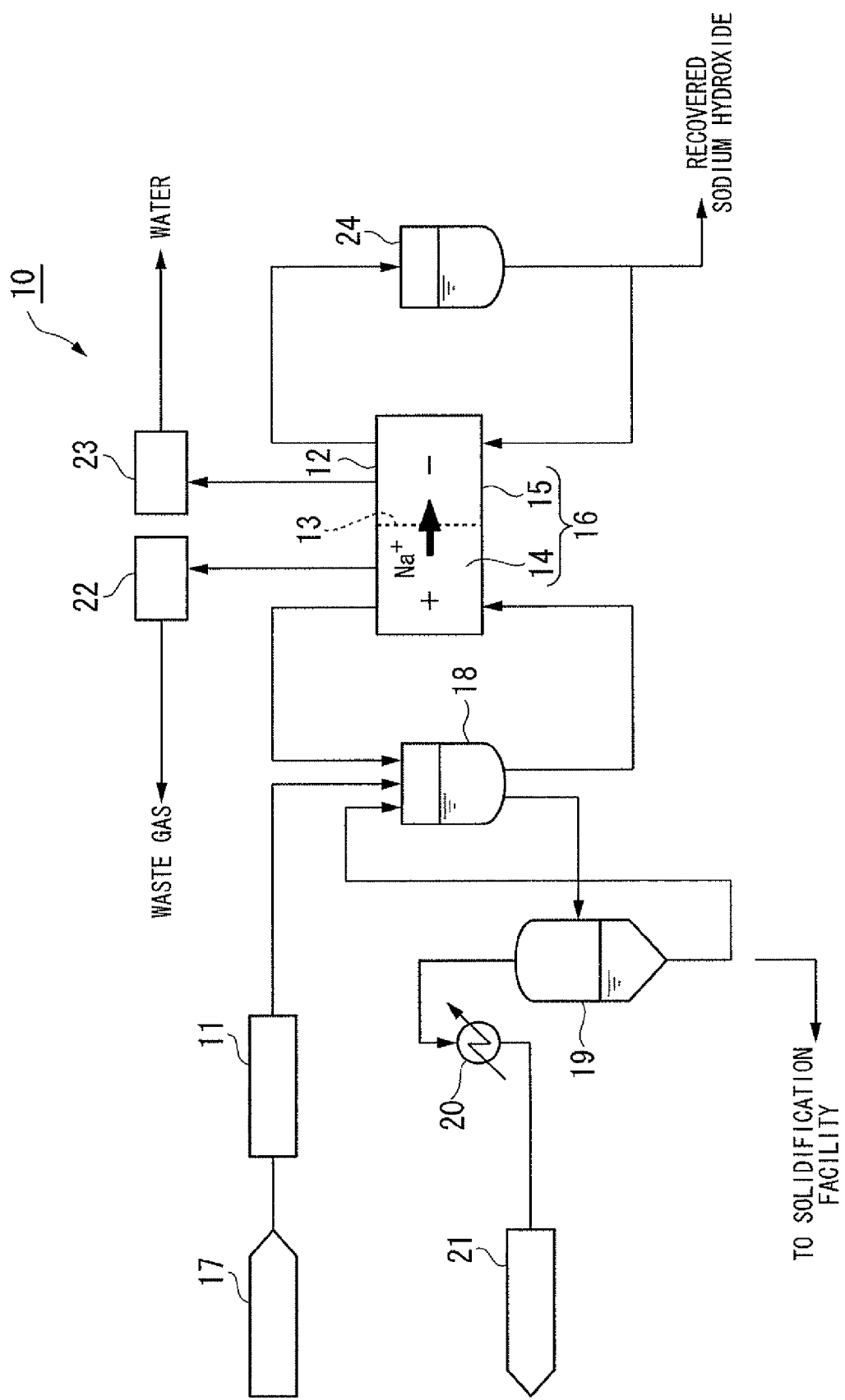

METHOD FOR TREATING RADIOACTIVE LIQUID WASTE AND APPARATUS FOR THE SAME

CROSS REFERENCE TO RELATED APPLICATIONS

The present application is the U.S. national phase application under 35 U.S.C. § 371 of PCT International Application Number PCT/JP2008/071687, filed Nov. 28, 2008, which claims priority to Japan Patent Application No. 2007-315152, filed on Dec. 5, 2007, the entirety of both which are incorporated herein by reference.

TECHNICAL FIELD

The present invention relates to a method and apparatus for treating a radioactive liquid waste.

BACKGROUND ART

A radioactive liquid waste containing mainly a large amount of sodium nitrate ($NaNO_3$) as an inorganic salt is generated from nuclear facilities, particularly reprocessing plants of spent fuel. The progress has been made in the development of a separation and removal technology in which sodium is separated from sodium nitrate in this liquid waste.

For example, in the United States Department of Energy (DOE), a study has been made on the method in which sodium ions ($Na^+$) are separated from a radioactive liquid waste containing sodium nitrate as a main component using a Na ionic conductor membrane (Na super ionic conductor (NASICON) membrane) or a polymer cation-exchange membrane. It is demonstrated that the Na ionic conductor membrane or the organic cation-exchange membrane enables recovery of sodium ions as sodium hydroxide (NaOH).

As the technology in which radioactive nuclides contained in a radioactive liquid waste are separated from sodium nitrate, there has been used a method in which main nuclides are respectively coprecipitated by adding a large number of reagents to a liquid waste and then a solid is separated through a ultrafiltration membrane. Since a lot of reagents are added in this method, the amount of the liquid waste increases. In addition, the limit of a decontamination factor (DF), which indicates the degree of removal of the radioactive nuclide with respect to a specific nuclide, is about 100 and the efficiency of removal of the radioactive nuclide in the radioactive liquid waste was low.

As the technology in which an attempt is made to reduce the volume of a radioactive liquid waste (concentrated low-level liquid waste) containing, as a main component, sodium nitrate generated from the reprocessing process, an electrodialysis method using a sodium ion permselective membrane is exemplified. This technology may enable separation and recovery of only sodium from the radioactive liquid waste, thus resulting in volume reduction of the radioactive liquid waste. Therefore, a treating test of a liquid waste using a polymer membrane (Nafion®, etc.) or an inorganic membrane (NASICON membrane) is performed.

As the technology in which sodium is recovered from a liquid waste containing a radioactive substance and/or a liquid waste containing no radioactive substance by an electrodialysis method using a sodium ion permselective membrane, papers such as Non-Patent Documents 1 to 5 have been published, and are currently known technologies.

Non-Patent Documents 1 to 5 disclose technologies in which sodium is recovered from a radioactive liquid waste (concentrated low-level radioactive liquid waste) containing sodium nitrate, or a liquid waste containing sodium generated from pulp mills by an electrodialysis method using a NASICON membrane.

In these technologies, sodium ions are migrated from an anode chamber to a cathode chamber by feeding a liquid waste to be treated to the anode chamber, filling the cathode chamber with an aqueous sodium hydroxide solution, and performing electrodialysis using a NASICON membrane as a diaphragm between the anode chamber and the cathode chamber of an electrolytic cell.

Non-Patent Documents 1 to 4 report that only sodium can be separated and recovered from a radioactive liquid waste containing many kinds of radioactive nuclides by separating only sodium without containing Cesium 137 (Cs-137) which belongs to the same group as that of sodium.

As the technology in which an attempt is made to reduce the volume of a radioactive liquid waste, the following technologies are disclosed.

For example, there is disclosed a technology in which an attempt is made to recover sodium and an acid from a radioactive liquid waste containing a high concentration of a sodium salt, thereby reducing the volume of this liquid waste and recycling the sodium and acid (see, for example, Patent Document 1). In this technology, electrodialysis is performed in a state where two bipolar membranes are disposed between an anode and a cathode and then an anion-exchange membrane is disposed between these bipolar membranes at the anode side and a sodium ion permselective membrane is disposed between these bipolar membranes at the cathode side, respectively. Thus, it is possible to separate and recover sodium ions from the radioactive liquid waste containing a sodium salt as sodium hydroxide, and to separate and recover anions from the radioactive liquid waste containing a sodium salt as an acid.

There is also disclosed a technology in which an attempt is made to remarkably reduce the volume of sodium nitrate, as a main component of a concentrated low-level radioactive liquid waste, generated from reprocessing plants without generating NOx which applies a burden on a waste gas system, and to close a radioactive waste processing system by recycling a decomposition product (see, for example, Patent Document 2). In this technology, the concentrated low-level radioactive liquid waste generated from reprocessing plants of spent fuel is fed to an electrolysis cell including a cation-exchange membrane and an anion exchange membrane. Thus, it is possible that sodium hydroxide is formed at the cathode side, and then separated and recovered from a concentrated radioactive liquid waste, and also nitric acid is formed at the anode side, and then separated and recovered from a concentrated radioactive liquid waste.

Non-Patent Document 1: S. Balagopal, et al., Selective sodium removal from aqueous waste streams with NaSICON ceramics, Separation and Purification Technology 15 (1999) 231-237.

Non-Patent Document 2: D. E. Kurath, et al., Caustic recycle from high-salt nuclear wastes using a ceramic-membrane salt-splitting process, Separation and Purification Technology 11 (1997) 185-198.

Non-Patent Document 3: D. T. Hobbs, Radioactive Demonstration of Caustic Recovery from Low-Level Alkaline Nuclear Waste by an Electrochemical Separation Process, WSRC-TR-97-00363 (1998).

Non-Patent Document 4: Proceeding of Efficient Separations and Processing Crosscutting Program, 1995, 1996, 1997.

Non-Patent Document 5: Ceramatec, Inc., Energy Efficient Process for Recycling Sodium Sulfate Utilizing Ceramic Solid Electrolyte, DOE contact No. DE-FCO2-95CE41158 (1999).

Patent Document 1: Japanese Unexamined Patent Application, First Publication No. 2000-321395

Patent Document 2: Japanese Unexamined Patent Application, First Publication No. Hei 4-283700

SUMMARY OF THE INVENTION

As described above, when sodium is separated and recovered from a radioactive liquid waste (concentrated low-level radioactive liquid waste) containing sodium nitrate as a main component by an electrodialysis method, sodium hydroxide containing no radioactive nuclide is formed in a cathode chamber, and thus the volume of the concentrated low-level radioactive liquid waste can be reduced to some extent.

However, since nitric acid containing radioactive nuclides is formed in an anode chamber, it is necessary to further treat nitric acid in view of volume reduction. Also, a solution of a strong alkali and a solution of a strong acid exist in a state where both solutions are isolated by a very thin (several mm) sodium ion permselective membrane, thus resulting in a problem such as very high chemical risk upon breakage of a permeable membrane.

When sodium ions are separated and recovered from a concentrated low-level radioactive liquid waste by an electrodialysis method using a NASICON membrane, a decrease in current efficiency of sodium ions and an increase in a bath voltage are recognized with a lapse of time. These phenomena are disadvantageous since volume reduction of the concentrated low-level radioactive liquid waste by the electrodialysis method leads to an increase in cost and an increase in burden on equipment and materials.

Although sodium hydroxide containing no radioactive nuclide can be separated and recovered from the concentrated low-level radioactive liquid waste by this electrodialysis method, nitric acid containing radioactive nuclides is formed. Therefore, it was impossible to efficiently perform volume reduction by concentrating only radioactive nuclides.

When a cation-exchange membrane is used as a diaphragm of an electrolytic cell, not only sodium ions but also radioactive nuclides migrate. In order to recover an acid from an acid containing radioactive nuclides formed by separating and recovering sodium, a bipolar membrane and an anion exchange membrane are used. However, also in this case, similar to the case of the cation-exchange membrane, not only anions but also radioactive nuclides migrate, and thus it is impossible to recover only an acid containing no radioactive nuclide. Furthermore, the bipolar membrane and anion exchange membrane are organic membranes and therefore have not sufficient radiation resistance, unlike an inorganic membrane such as a NASICON membrane.

Under the circumstances describes above, the present invention has been made and an object thereof is to provide a method and apparatus for treating a radioactive liquid waste in which volume reduction of the radioactive liquid waste can be performed safely and more efficiently by separating and recovering sodium ions from a radioactive liquid waste containing sodium nitrate as a main component without forming a nitric acid containing radioactive nuclides.

The method for treating a radioactive liquid waste of the present invention includes: a step in which a radioactive liquid waste containing at least one of sodium hydroxide, sodium hydrogencarbonate and sodium carbonate is fed to an anode chamber in an electrolytic cell provided with an anode and a cathode on both sides of a permeable membrane, which is selectively permeable to sodium ions, and the radioactive liquid waste is electrodialyzed; a step in which sodium ions permeated through the permeable membrane is separated as sodium hydroxide from the radioactive liquid waste in a cathode chamber; a step in which a radioactive substance remaining in the anode chamber is separated the radioactive liquid waste as a concentrated radioactive liquid waste; and a step in which the separated sodium hydroxide and the concentrated radioactive liquid waste are recovered, respectively.

At least one of the sodium hydroxide, sodium hydrogencarbonate and sodium carbonate may be formed by salt conversion of sodium nitrate contained in the radioactive liquid waste.

The salt conversion may be performed using a treating method by a chemical reaction using a reducing agent and/or a treating method using electrolysis.

The method for treating by a chemical reaction using a reducing agent may be performed in the presence of a catalyst and/or under high temperature and high pressure conditions.

The apparatus for treating a radioactive liquid waste containing a sodium salt of the present invention includes a salt conversion device for salt conversion of sodium nitrate into at least one of sodium hydroxide, sodium hydrogencarbonate and sodium carbonate; and an electrodialysis device including a permeable membrane which is selectively permeable to sodium ions, an anode chamber and a cathode chamber provided via the permeable membrane, and an anode and a cathode provided on both sides of the permeable membrane, respectively.

The method for treating a radioactive liquid waste of the present invention is a method for treating a radioactive liquid waste containing a sodium salt, a radioactive liquid waste containing at least one of sodium hydroxide, sodium hydrogencarbonate and sodium carbonate is fed to an anode chamber in an electrolytic cell provided with an anode and a cathode on both sides of a permeable membrane, which is selectively permeable to sodium ions, and the radioactive liquid waste is electrodialyzed. Sodium ions permeated through the permeable membrane is separated as sodium hydroxide from the radioactive liquid waste in the cathode chamber, and radioactive substance remaining in the anode chamber is separated as a concentrated radioactive liquid waste. Then, the separated sodium hydroxide and the concentrated radioactive liquid waste are recovered, respectively. Therefore, it is possible to separate and recover sodium ions containing no radioactive nuclide as sodium hydroxide from the radioactive liquid waste, and also to separate only radioactive nuclides from the radioactive liquid waste and to concentrate the radioactive nuclides. Therefore, it becomes possible to reduce the kind and total number of wastes, thus resulting in easy handling of separated sodium.

Since nitrate ions do not exist in the system, it is possible to eliminate environmental burden associated with nitrate ions.

In addition, nitric acid containing radioactive nuclides is not formed in an anode chamber and a solution of a strong alkali and a solution of a strong acid do not exist in a state where both solutions are isolated by a very thin (several mm) sodium ion permselective membrane, thus reducing chemical risk upon breakage of a permeable membrane.

Furthermore, since a volume reduction ratio is higher than that in the case of a conventional method for treating a radioactive liquid waste using an electrodialysis method and current efficiency of sodium is high, and also the lifetime of a permeable membrane provided in an electrolytic cell becomes longer, and treatment cost and a final disposal site can be remarkably reduced.

The apparatus for treating a radioactive liquid waste of the present invention is an apparatus for treating a radioactive liquid waste containing a sodium salt, which includes a salt conversion device for salt conversion of sodium nitrate into at least one of sodium hydroxide, sodium hydrogencarbonate and sodium carbonate; and an electrodialysis device including a permeable membrane which is selectively permeable to sodium ions, an anode chamber and a cathode chamber provided via the permeable membrane, and an anode and a cathode provided on both sides of the permeable membrane, respectively. It is possible to separate and recover sodium ions containing no radioactive nuclide as sodium hydroxide from the radioactive liquid waste. It is also possible to separate only radioactive nuclides from the radioactive liquid waste and to concentrate the radioactive nuclides, and thus a volume reduction ratio of the radioactive liquid waste can be increased.

It is also possible to bipolarize the radioactive liquid waste by adjusting the concentration of concentrated radioactive nuclides contained in the radioactive liquid waste to the concentration identical to that of radioactive nuclides contained in the high-level radioactive waste.

Furthermore, since the volume reduction ratio is higher than that in the case of a conventional method for treating a radioactive liquid waste using an electrodialysis method and current efficiency of sodium is high, and also the lifetime of a permeable membrane provided in an electrolytic cell becomes longer, the treatment cost and a final disposal site can be remarkably reduced.

BRIEF DESCRIPTION OF THE DRAWINGS

FIG. 1 is a schematic block flow diagram showing one embodiment of an apparatus for treating a radioactive liquid waste of the present invention.

DESCRIPTION OF REFERENCE NUMERALS

10: Radioactive liquid waste treating apparatus

11: Salt conversion device
12: Electrodialysis device
13: Permeable membrane
14: Anode chamber
15: Cathode chamber
16: Electrolytic cell
17: Radioactive liquid waste storage tank
18: Anolyte receiving tank
19: Evaporator
20: Condenser
21: Condensed water storage tank
22: First gas treating apparatus
23: Second gas treating apparatus
24: Catholyte receiving tank

DETAILED DESCRIPTION OF THE INVENTION

Embodiment of a method and apparatus for treating a radioactive liquid waste of the present invention will be described.

This embodiment is intended to be illustrative for easier understanding of the spirit of the invention and not to be limiting the invention unless otherwise specified.

FIG. 1 is a schematic block flow diagram showing one embodiment of an apparatus for treating a radioactive liquid waste of the present invention.

An apparatus for treating a radioactive liquid waste (hereinafter referred to as a "radioactive liquid waste treating apparatus") 10 of this embodiment is generally composed of a salt conversion device 11, an electrodialysis device 12, a radioactive liquid waste storage tank 17, an anolyte receiving tank 18, an evaporator 19, a condenser 20, a condensed water storage tank 21, a first gas treating apparatus 22, a second gas treating apparatus 23 and a catholyte receiving tank 24.

The electrodialysis device 12 is equipped with an electrolytic cell 16, a permeable membrane 13 by which this electrolytic cell 16 is separated into an anode chamber 14 and a cathode chamber 15, an anode (not shown) provided in the anode chamber 14, and a cathode (not shown) provided in the cathode chamber 15. Namely, the anode and the cathode are provided on both sides of the permeable membrane 13, respectively.

The salt conversion device 11 is an apparatus for salt conversion of sodium nitrate ($NaNO_3$) contained in the radioactive liquid waste fed from the radioactive liquid waste storage tank 17 into at least one of sodium hydroxide (NaOH), sodium hydrogencarbonate ($NaHCO_3$) and sodium carbonate ($Na_2CO_3$).

As this salt conversion device 11, an apparatus using a treating method by a chemical reaction using a reducing agent and/or a treating method using electrolysis is exemplified. The treating apparatus by a chemical reaction using a reducing agent may be an apparatus using a method of treating in the presence of a catalyst and/or under high temperature and high pressure conditions.

The apparatus using the treating method by a chemical reaction using a reducing agent includes, for example, an apparatus in which a reduction is allowed to proceed by introducing, as a reducing agent, at least one of formalin, hydrazine and formic acid into a radioactive liquid waste containing sodium nitrate.

Furthermore, the apparatus using a treating method by a chemical reaction using a reducing agent in the presence of a catalyst includes, for example, an apparatus in which nitrate ions are reduced into nitrogen or ammonia by introducing a reducing agent into a liquid waste containing sodium nitrate in the presence of a copper catalyst. The apparatus using a treating method by a chemical reaction using a reducing agent under high temperature and high pressure conditions includes, for example, an apparatus in which nitrate ions are decomposed by adding a reducing agent to a liquid waste containing sodium nitrate and subjecting the solution to high temperature and high pressure.

The apparatus using a treating method using electrolysis includes, for example, an apparatus in which sodium chloride is dissolved in a liquid waste containing nitrate ions and nitrate ions can be reduced into nitrogen (ammonia) by sodium hypochlorite formed by electrolysis.

It is possible to use, as the permeable membrane 13 of the electrodialysis device 12, a membrane which is selectively permeable to sodium ions and is made of ceramics, and examples of the permeable membrane include a Na ionic conductor membrane (Na super ionic conductor (NASICON) membrane, and a sodium ion permselective membrane made of β-alumina.

As the anode of the electrodialysis device 12, a dimensionally stable electrode (DSE) or a platinum plated titanium electrode is used.

As the cathode of the electrodialysis device 12, a platinum plated titanium electrode is used.

The electrodialysis device 12 is connected to the first gas treating apparatus 22 via a passage.

In this first gas treating apparatus 22, oxygen or carbon dioxide generated in an anode chamber by electrodialysis of a radioactive liquid waste in the electrodialysis device 12 is recovered by adsorbing to an adsorbent, or discharged outside in a safe state. In the first gas treating apparatus 22, a radioactive gas released with the change in pH of radioactive liquid waste in the anode chamber 14 during electrodialysis is separated and recovered.

In the second gas treating apparatus 23, predetermined air is added to hydrogen generated by electrodialysis of the radioactive liquid waste in the electrodialysis device 12 thereby oxidizing hydrogen into water in the presence of a catalyst, and then water is discharged outside.

The action of this radioactive liquid waste treating apparatus 10 will be described, and also the method for treating a radioactive liquid waste of this embodiment will be described.

First, in the salt conversion device 11, a radioactive liquid waste generated from nuclear facilities such as processing plants of spent fuel, which is temporarily stored in the radioactive liquid waste storage tank 17, is subjected to a salt conversion treatment.

This radioactive liquid waste is a liquid which contains sodium nitrate as a main component, and contains radioactive nuclides. The salt conversion treatment is a treatment for converting sodium nitrate contained in the radioactive liquid waste into at least one of sodium hydroxide, sodium hydrogencarbonate and sodium carbonate.

The salt conversion treatment is a treating method by a chemical reaction using a reducing agent and/or a treating method using electrolysis. Furthermore, the treating method by a chemical reaction using a reducing agent may be a method of treating in the presence of a catalyst and/or under high temperature and high pressure conditions.

The treating method by a chemical reaction using a reducing agent includes, for example, a method by reduction by introducing, as a reducing agent, at least one of formalin, hydrazine and formic acid into a liquid waste containing sodium nitrate.

Furthermore, the treating method by a chemical reaction using a reducing agent in the presence of a catalyst includes, for example, a method in which nitrate ions are reduced into nitrogen or ammonia by introducing a reducing agent into a liquid waste containing sodium nitrate in the presence of a copper catalyst.

The treating method by a chemical reaction using a reducing agent under high temperature and high pressure conditions includes, for example, a method in which nitrate ions are decomposed by adding a reducing agent to a liquid waste containing sodium nitrate and subjecting the solution to a high temperature and high pressure.

The treating method using electrolysis includes, for example, a method in which sodium chloride is dissolved in a liquid waste containing nitrate ions and nitrate ions can be reduced into nitrogen (ammonia) by sodium hypochlorite formed by electrolysis.

Next, the radioactive liquid waste containing a high concentration of at least one sodium salt of sodium hydroxide, sodium hydrogencarbonate and sodium carbonate formed by subjecting sodium nitrate to a salt conversion treatment is fed into the anolyte receiving tank 18.

As used herein, the radioactive liquid waste containing a high concentration of a sodium salt is specifically a liquid which contains 1 mol/L or more of a sodium salt, and preferably in a range of from 1 mol/L to 35 mol/L of a sodium salt.

Next, when the amount of radioactive liquid waste in the anolyte receiving tank 18 reaches a predetermined amount, the radioactive liquid waste is fed into the anode chamber 14 of the electrodialysis device 12.

A low-concentration aqueous sodium hydroxide solution is fed in advance to the cathode chamber 15 of the electrodialysis device 12. The concentration of the aqueous sodium hydroxide solution, which is to be fed in advance to the cathode chamber 15, is adjusted within a range where electrodialysis can be efficiently performed, and is preferably adjusted to a range of from 0.1 mol/L to 5 mol/L.

Next, in the electrodialysis device 12, the radioactive liquid waste containing at least one sodium salt of sodium hydroxide, sodium hydrogencarbonate or sodium carbonate is electrodialyzed.

The temperature of the electrolytic cell 16 (anode chamber 14 and cathode chamber 15) of the electrodialysis device 12 upon electrodialysis is appropriately adjusted according to the kind and concentration of the sodium salt contained in the radioactive liquid waste, and may be a range of from room temperature (20° C.) to 100° C.

By electrodialysis of this radioactive liquid waste, only sodium ions ($Na^+$) among ions (sodium ions ($Na^+$), hydroxide ions ($OH^-$), hydrogencarbonate ions ($HCO_3^-$), carbonate ions ($CO_3^-$)) originating in the above sodium salt selectively permeate through the permeable membrane 13 and migrates from the anode chamber 14 into an aqueous sodium hydroxide solution in the cathode chamber 15.

In the anode chamber 14, regarding sodium hydroxide contained in the radioactive liquid waste, hydroxide ions ($OH^-$) are recovered as water with the progress of separation and recovery of sodium ions during electrodialysis. At the time, in the anode chamber 14, a chemical reaction relating to hydroxide ions shown in the following scheme (1) proceeds.

$$4OH^- \rightarrow 2H_2O + O_2\uparrow + 4e^- \quad (1)$$

In the anode chamber 14, regarding sodium hydrogencarbonate and/or sodium carbonate, the pH of the radioactive liquid waste in the anode chamber 14 decreases with the progress of separation and recovery of sodium ions during electrodialysis. Therefore, hydrogencarbonate ions ($HCO_3^-$) and/or carbonate ions ($CO_3^-$) are discharged as carbon dioxide from the anode chamber 14, thus recovering as water. At this time, in the anode chamber 14, a chemical reaction relating to hydrogencarbonate ions shown in the following scheme (2) proceeds.

$$2HCO_3^- + 2OH^- \rightarrow 2H_2O + 2CO_2\uparrow + O_2\uparrow + 4e^- \quad (2)$$
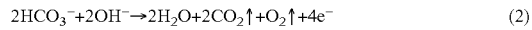

Also in the anode chamber 14, chemical reactions relating to carbonate ions shown in the following schemes (3) and (4) proceed.

$$CO_3^- {+^H_2O} \rightarrow HCO_3^- + OH^- \quad (3)$$

$$2HCO_3^- + 2OH^- \rightarrow 2H_2O + 2CO_2\uparrow + O_2\uparrow + 4e^- \quad (4)$$
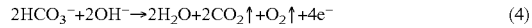

Oxygen and carbon dioxide generated by electrodialysis of the radioactive liquid waste in the electrodialysis device 12 are fed to the first gas treating apparatus 22, where they are recovered by being adsorbed into an adsorbent, or discharged outside in a safe state.

Next, the concentration of the aqueous sodium hydroxide solution in the cathode chamber 15 gradually increases by sodium ions which permeate through the membrane 13 and migrate from the anode chamber 14 to the cathode chamber 15. When the concentration reaches a predetermined concentration, the aqueous sodium hydroxide solution is fed into the catholyte receiving tank 24.

Next, in the catholyte receiving tank 24, a portion of the aqueous sodium hydroxide solution is recovered. The aqueous sodium hydroxide solution remaining in the catholyte receiving tank 24 is diluted to a predetermined concentration, fed into the cathode chamber 15 again, and used for electrodialysis of the radioactive liquid waste in the electrodialysis device 12.

After the electrodialysis of the radioactive liquid waste in the electrodialysis device 12 proceeded and the concentration of sodium in the anode chamber 14 decreased to a predetermined concentration, this solution containing radioactive nuclides (the concentration of radioactive nuclides does not vary before and after electrodialysis (before concentration)) is fed into the evaporator 19 via the anolyte receiving tank 18.

Next, in the evaporator 19, the solution fed from the anode chamber 14 is distilled and thus radioactive nuclides are separated and recovered from this solution.

The radioactive nuclides thus separated and recovered are fed to glass solidification facilities or cement solidification facilities, where the radioactive nuclides are solidified by glass or cement.

Water formed by this distillation step is further condensed in the condenser 20 and the condensed water formed herein is stored in the condensed water storage tank 21.

A portion of the solution after distillation is fed into the anode chamber 14 again via the anolyte receiving tank 18, and used for electrodialysis of the radioactive liquid waste in the electrodialysis device 12.

According to the radioactive liquid waste treating apparatus 10 of this embodiment and the method for treating a radioactive liquid waste using the same, the sodium nitrate contained in the radioactive liquid waste is subjected to a salt conversion treatment to form at least one sodium salt of sodium hydroxide, sodium hydrogencarbonate and sodium carbonate, and then the radioactive liquid waste containing this sodium salt is electrodialyzed using a permeable membrane which is selectively permeable to sodium ions. Therefore, it is possible to separate and recover sodium ions containing no radioactive nuclide as sodium hydroxide from the radioactive liquid waste, and to separate only radioactive nuclides from the radioactive liquid waste and to concentrate the radioactive nuclides. As a result, a volume reduction ratio of the radioactive liquid waste can be increased. Specifically, the volume of the radioactive liquid waste can be reduced to about 1/1,000 to 1/100 or less of the volume of the stock solution before subjecting to the treatment. It becomes possible to reduce the kind and total number of wastes by performing volume reduction. Also, it becomes easy to handle the separated sodium. Furthermore, since a volume reduction ratio is higher than that in the case of a conventional method for treating a radioactive liquid waste using an electrodialysis method and current efficiency of sodium is high, and also the lifetime of a permeable membrane provided in an electrolytic cell becomes longer, the treatment cost and final disposal site can be remarkably reduced.

Since sodium nitrate contained in the radioactive liquid waste is subjected to a salt conversion treatment to form a sodium salt and a radioactive liquid waste containing this sodium salt is electrodialyzed, an acid (nitric acid) containing radioactive nuclides is not generated. Therefore, the treatment of the concentrated radioactive liquid waste can be simplified. Furthermore, since sodium nitrate is subjected to a salt conversion treatment to form a sodium salt, it is possible to eliminate environmental burden associated with nitrate ions.

This embodiment exemplified a case in which sodium nitrate contained in the radioactive liquid waste was subjected to a salt conversion treatment to form at least one salt of sodium hydroxide, sodium hydrogencarbonate and sodium carbonate, and then the radioactive liquid waste containing this sodium salt was electrodialyzed using a permeable membrane which is selectively permeable to sodium ions. However, the present invention is not limited thereto and the radioactive liquid waste containing at least one sodium salt of sodium hydroxide, sodium hydrogencarbonate and sodium carbonate may be electrodialyzed. Also in this case, the same effects as those of the above embodiment are exerted.

The present invention will be described in more detail by way of Examples, but the present invention is not limited to the following Examples.

Using a radioactive liquid waste treating apparatus shown in FIG. 1, a test was separately performed with respect to a salt conversion treatment and electrodialysis.

Example 1

Salt Conversion Treatment

The following test was performed so as to confirm reactivity associated with a salt conversion treatment of nitrate ions by a chemical reaction using a reducing agent in the presence of a catalyst.

To 0.5 L of a sodium nitrate ($NaNO_3$) solution in which the concentration of nitrate ions ($NO_3^-$) is 80,000 mg/mL, a platinum-copper (Pd—Cu)-based catalyst was added, followed by stirring. Furthermore, a predetermined amount of hydrazine or formaldehyde was added as a reducing agent.

A liquid phase of this solution was collected every predetermined time since the initiation of the reaction. Chemical species associated with a redox reaction were quantitatively determined by chemical analysis of this liquid phase and chemical composition analysis of the gas formed.

The influence of the additive amount of a catalyst, the additive amount of a reducing agent, the temperature and the pH of the reaction solution (herein sodium nitrate solution) on the redox reaction was examined. After completion of the addition of a reducing agent, appropriate conditions required for the reaction to quickly reach the end point were found.

Main redox reaction relating to sodium nitrate is represented by the following schemes (5) and (6).

In this Example, it became apparent that 90% or more of nitrate ions are converted into nitrogen ($N_2$) and a trace amount of ammonium ions ($NH_4^+$), ammonia ($NH_3$) and nitrous oxide ($N_2O$) are formed. Sodium nitrate was converted into sodium hydroxide or sodium carbonate as a result of salt conversion.

$$4NaNO_3 + 5N_2H_4 \rightarrow 7N_2 + 4NaOH + 8H_2O \qquad (5)$$

$$4NaNO_3 + 5HCHO + 6NaOH \rightarrow 2N_2 + 5Na_2CO_3 + 8H_2O \qquad (6)$$

In one example, it was confirmed that since the remaining concentration of nitrate ions and a reducing agent is minimized by adjusting the additive amount of the reducing agent to about the reaction equivalent ($N_2H_4/NaNO_3=1.25$ (mol/mol)) in a relation between a ratio of hydrazine to sodium nitrate and a decomposition ratio (nitric acid+nitrous acid), decomposition efficiency of nitrate ions can be remarkably increased by controlling the additive amount of the reducing agent.

Example 2

Electrodialysis 1

It is presumed that when sodium carbonate is formed by salt conversion of sodium nitrate and a solution containing this sodium carbonate is electrodialyzed, carbonate ions are decomposed upon recovery of sodium ions during to generate carbon dioxide. The following test was performed so as to confirm such decomposition reaction of carbonate ions.

An aqueous sodium carbonate solution (1.8 mol/L (3.6 mol/L in terms of sodium)) was fed to an anode chamber of an electrodialysis device in which a cation-exchange membrane (Nafion N-450 membrane, manufactured by Du Pont) is used as a permeable membrane, a dimensionally stable electrode (DSE) is used as an anode, and platinum plated titanium electrode is used as a cathode. An aqueous sodium hydroxide solution (3.6 mol/L (3.6 mol/L in terms of sodium)) was fed to a cathode chamber of this electrodialysis device.

Next, an aqueous sodium carbonate solution was electrodialyzed at room temperature and the aqueous solution during electrodialysis was collected. Chemical analysis of this aqueous solution was performed and also chemical composition analysis of the gas formed was performed.

As a result, it was confirmed that sodium migrates to the anode chamber by electrodialysis, and also carbon dioxide is generated with a decrease in pH of the anode chamber. Thus, it was confirmed that carbonate ions are decomposed during separation and recovery of sodium ions by electrodialysis to generate carbon dioxide. It was also confirmed that, even if a crystal of sodium hydrogencarbonate is precipitated in the anode chamber, migration of sodium ions from the anode chamber to the cathode chamber by electrodialysis continues.

Example 3

Electrodialysis 2

The following electrodialysis test of an aqueous sodium hydroxide solution was performed.

An aqueous sodium hydroxide solution (5 mol/L) was fed to an electrolytic cell (anode chamber and cathode chamber) of an electrodialysis device in which a NASICON membrane is used as a permeable membrane and a platinum plated titanium electrode is used as an anode and a cathode.

Next, an aqueous sodium hydroxide solution was electrodialyzed at 40° C. and an aqueous solution during electrodialysis was collected every predetermined time since the initiation of the reaction. Chemical analysis of this aqueous solution was performed and a change in concentration of sodium was examined. Also, the electrolysis voltage and the current density were measured from the ignition to completion of the reaction.

As a result, 95% by weight of sodium could be removed from the anode chamber. In this case, current efficiency was high (95% or more) and it was confirmed that a large amount of sodium can be efficiently removed from the aqueous sodium hydroxide solution by an electrodialysis method using a NASICON membrane as a permeable membrane.

Example 4

Electrodialysis 3

The following electrodialysis test of an aqueous sodium carbonate solution was performed.

An aqueous sodium carbonate solution (2.5 mol/L) was fed in an electrolytic cell (anode chamber and cathode chamber) of an electrodialysis device in which a NASICON membrane is used as a permeable membrane and a platinum plated titanium electrode is used as an anode and a cathode.

Next, an aqueous sodium carbonate solution was electrodialyzed at 60° C. and an aqueous solution during electrodialysis was collected every predetermined time since the initiation of the reaction. Chemical analysis of this aqueous solution was performed and a change in concentration of sodium was examined. Also, an electrolysis voltage and a current density were measured from the ignition to completion of the reaction.

As a result, at the time when the concentration of sodium carbonate of the aqueous solution fed in the anode chamber reached 0.5 mol/L or less, the electrolysis voltage increased with an increase in resistance, and a decreased in current efficiency was recognized. However, 95% by weight of sodium could be removed from the cathode chamber. In this case, current efficiency was high (95% or more) and it was confirmed that a large amount of sodium can be efficiently removed from the aqueous sodium carbonate solution by an electrodialysis method using a NASICON membrane as a permeable membrane. It was also confirmed that a large amount of carbon dioxide is generated during electrodialysis.

Example 5

Electrodialysis 4

The following electrodialysis test was performed using, as a solution of interest, a solution prepared by adding radioactive nuclides to an aqueous sodium hydroxide solution.

Using, as an anolyte, a solution prepared by adding Cs-137, Ce-139, Ru-106, Sr-85, Am-241 and Np-237 to a solution having a concentration of sodium hydroxide adjusted to 5 mol/L, the solution was fed to an electrolytic cell in which a NASICON membrane is used as a diaphragm, and then an electrodialysis test was performed at 40° C. The concentration of radioactive nuclides used is as follows: Cs-137 (2,000 Bq/mL), Ce-139 (1,000 Bq/mL), Ru-106 (300 Bq/mL), Sr-85 (4,000 Bq/mL), Am-241 (10 Bq/mL), and Np-237 (10 Bq/mL). Sodium hydroxide (4 mol/L) was used as a catholyte.

As a result of electrodialysis for 30 hours, about 70% of Na was recovered from the anode chamber. At that time, the radioactivity concentration in the catholyte was a detection limit or less, excluding Cs-137. Permeation of a trace amount of Cs-137 in the catholyte was recognized.

As a result, it was confirmed that it is possible to concentrate radioactive nuclides at the anode side and to recover sodium by an electrodialysis method using a NASICON membrane.

Example 6

Electrodialysis 5

The following electrodialysis test was performed using, as a solution of interest, a solution prepared by adding radioactive nuclides to an aqueous sodium carbonate solution.

Using, as an anolyte, a solution prepared by adding Cs-137, Ce-139, Ru-106, Sr-85, Am-241 and Np-237 to a solution having a concentration of sodium carbonate adjusted to 1.5 mol/L, the solution was fed to an electrolytic cell in which a NASICON membrane is used as a diaphragm, and then an electrodialysis test was performed at 60° C. The concentration of radioactive nuclides used is as follows: Cs-137 (2,000 Bq/mL), Ce-139 (1,000 Bq/mL), Ru-106 (300 Bq/mL), Sr-85 (2,000 Bq/mL), Am-241 (30 Bq/mL), and Np-237 (30 Bq/mL). Sodium hydroxide (4 mol/L) was used as a catholyte.

As a result of electrodialysis for 30 hours, about 70% of Na was recovered from the anode chamber. At that time, the radioactivity concentration in the catholyte was a detection limit or less, excluding Cs-137. Permeation of a trace amount of Cs-137 in the catholyte was recognized.

As a result, it was confirmed that it is possible to concentrate radioactive nuclides at the anode side and to recover sodium by an electrodialysis method using a NASICON membrane.

From the results of (Example 5: Electrodialysis 4) and (Example 6: Electrodialysis 5) described above, it was confirmed that it is possible to concentrate radioactive nuclides contained in sodium hydroxide and sodium carbonate at the anolyte side and to recover sodium at the cathode side by an electrodialysis method using a NASICON membrane.

According to the method and apparatus for treating a radioactive liquid waste of the present invention, it is possible to perform volume reduction of the radioactive liquid waste safely and more efficiently by separating and recovering sodium ions from a radioactive liquid waste containing sodium nitrate as a main component without forming a nitric acid containing radioactive nuclides.

The invention claimed is:

1. A method for treating a radioactive liquid waste, which comprises:

feeding a radioactive liquid waste comprising at least one of sodium hydroxide, sodium hydrogen carbonate and sodium carbonate, formed by salt conversion of sodium nitrate in the radioactive liquid waste, to an anode chamber in an electrolytic cell comprising an anode and a cathode on both sides of a membrane selectively permeable to sodium ions, and electrodialyzing the radioactive liquid waste without generating an acid;

separating sodium ions permeated through the membrane as sodium hydroxide from the radioactive liquid waste in a cathode chamber;

separating a radioactive substance remaining in the anode chamber as a concentrated radioactive liquid waste; and recovering the separated sodium hydroxide and the concentrated radioactive liquid waste.

2. The method for treating a radioactive liquid waste according to claim 1, wherein the salt conversion comprises a reducing agent and/or a treating method using electrolysis.

3. The method for treating a radioactive liquid waste according to claim 2, wherein the treating method by a chemical reaction using a reducing agent comprises a catalyst and/or under high temperature and high pressure conditions.

* * * * *